Jan. 11, 1949. R. P. DAVIE, JR 2,458,686
EXTRUDED SHAPE
Filed Jan. 31, 1942

Robert P. Davie, Jr.
INVENTOR.

BY *James M. Clark*

*His Patent Attorney*

Patented Jan. 11, 1949

2,458,686

UNITED STATES PATENT OFFICE 2,458,686

EXTRUDED SHAPE

Robert P. Davie, Jr., Manhattan Beach, Calif., assignor to North American Aviation, Inc., Inglewood, Calif., a corporation of Delaware Application January 31, 1942, Serial No. 428,986

6 Claims. (Cl. 244—117)

The present invention relates to metallic structural shapes and the method of producing extrusions of an integrally reinforced type.

In the construction of hollow metallic bodies, or walled structures, including buildings, tanks, marine hulls and more particularly the fuselages and wings of aircraft, the exterior walls are generally either of the self-reinforced type or are such that they require a structural skeleton or framework of a complex nature which supports the relatively weak outer wall at a great number of points. As applied to aircraft fuselages and wings the first mentioned type is generally known as monocoque or stressed skin construction, and the latter type as composite or built-up construction. The construction of the present invention as applied to aircraft bodies, is of the stressed skin type or might also be properly designated as of the semi-monocoque type construction in which a reinforced stress-taking skin is supported only at widely spaced intervals by the main load-carrying structural members which might be the spars of the wing, or the longerons of the fuselage.

One of the more common types of monocoque and semi-monocoque construction in prior practice, particularly for the upper and lower surfaces of the thicker portions of aircraft wings, utilized the high strength-to-weight ratios of corrugated metal sheets running spanwise of the wing. These corrugated sheets, however, require the attachment of an additional smooth outer skin addressed to the airstream and quite frequently necessitate the addition of longitudinal reinforcing stringers at the stressed portions which are attached to the corrugations with difficulty and increased time and expense of production.

The structural wall or skin element of the present invention eliminates all of the above difficulties and objections, and further provides an improved structural element of high strength-to-weight ratio which is readily shaped, cut and fabricated and attached with a minimum number of fastenings, presenting a relatively smooth exterior surface to the airstream or other surrounding fluid. The present invention comprises essentially an integrally reinforced wall or skin element having a smooth outer surface and perpendicularly disposed reinforcing portions on its inner surface; and the method of producing such elements by the extrusion of a cylindrical shape with the said reinforcement portions extending radially and the subsequent bending of the cylindrical wall into a flat or curved surface, such method being made the subject matter of application Serial No. 52,742 filed October 4, 1948, covering the "Method of producing extruded shapes."

It is accordingly a major object of the present invention to provide a wall or skin covering element of high strength-to-weight ratio which is economically produced and assembled into the completed structure with a minimum number of attachments or fastenings. It is an object of equal importance to provide a method of producing such structural elements by an initial extrusion step and a subsequent bending operation, to thereby produce structural elements of shapes and characteristics which are not readily obtained by rolling or other methods.

It is also an object of the present invention to produce an improved covering comprising an integrally reinforced plate or skin element having a high moment of inertia and resistance to compression and tension in its longitudinal direction. It is also an object to produce a skin element particularly suitable for use as an aerodynamic covering which is relatively free of rivets or fastenings and which is thereby readily and economically assembled without the requirement of numerous and expensive countersunk rivets with their accompanying effect upon the resistance of the outer surface of the covering.

It is a still further object of the present invention to produce a wall or plate element which is assembled into a fabricated structure with a minimum number of separate structural elements and thereby eliminate the use of extra attachments and connections heretofore required by these additional elements. Another object resides in the production of a seamless skin element which is particularly adapted for use as an efficient stressed skin for aircraft, and a further object is to produce a skin element which is particularly adapted, but not limited in use, to high altitude pressurized aircraft by virtue of its resistance characteristics to internal as well as external pressures.

Other objects, uses and advantages of the present invention will become apparent to those versed in the art after a reading of the attached specification and the accompanying drawings forming a part hereof, in which.

Figure 1:
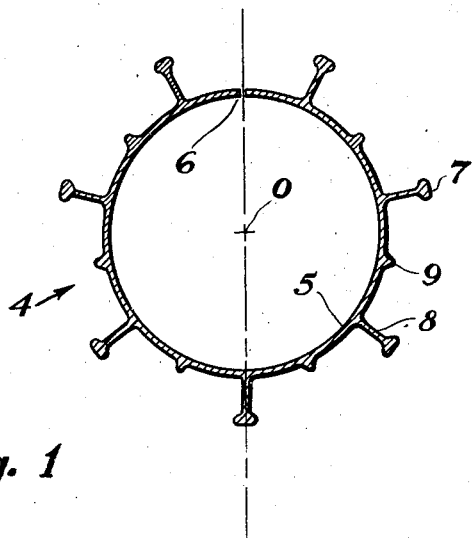
Fig. 1 shows a cross sectional view of a preferred form of the structural element as it appears after being extruded.

Referring now to Fig. 1, the structural element 4 comprises a cylindrical wall or plate portion 5 of uniform thickness, which presents a true cylindrical surface on its inner portion and is provided with radially extending reinforcement portions on its outer surface. The extrusion 4 which has been selected in Fig. 1 as a preferred modification is provided with seven radially and outwardly extending web or stem portions 8, each provided at their outer ends with bulbous portions 7. The die, which surrounds the central mandrel, neither of which is shown, is provided with radially and outwardly extending openings through which the material is extruded to form the reinforcement portions 7—8. These reinforcements are equally spaced the circumference of the cylindrical extrusion and are intermediately provided with longitudinally extending ribs or stiffeners 9 which are also disposed outwardly in a radial direction from the wall of the cylindrical shell portion 5, being of considerably less height than the major reinforcements 7—8. Both the larger reinforcements 7—8 and the smaller ribs or excrescences 9 are designed with fillets or well-rounded corners in order to produce extrusions of good quality which are relatively free from crystallization and undesired curvature which would normally result from irregularities in the shape and thickness of the extruded cross section. A balanced die and extrusion is accordingly obtained by spacing the reinforcements 7—8 equally around the circumference of the cylindrical shell 5 and providing the lower ribs 9 also equally spaced midway between the reinforcements 7—8 as well as being equally spaced from each other. It will be noted, however, that the rib 9 is omitted at the top of the extrusion along the center line O of the mandrel and at the point indicated at 6 in Fig. 1. The omission of the rib at this point permits the cylindrical extrusion to be split at the point 6 as it leaves the extrusion press.

The forms and shapes of the structural elements contemplated by the present invention are adapted for use with substantially all of the materials which are ordinarily capable of being extruded. As applied to aircraft, the materials preferably used are aluminum, aluminum and magnesium alloys as well as other light weight, high strength metals having similar or other desirable characteristics.

The raw material in the form of a solid billet is first preheated to a temperature just below the plastic point. It is then placed in the extrusion press and under pressure from the press ram or piston, the temperature of the billet will increase to the point where the metal can be readily forced to flow through the female die opening opposite the piston and around the central male mandrel. Such billets vary in length and diameter according to the capacity of the press and will produce varying lengths of extruded sections based upon the volume of metal per foot of the extrusion. At the end of the press stroke the extrusion is cut off outside the die and the end of the billet still in the press is discarded since it usually contains most of the impurities present in the billet.

It is possible to avoid excessive warpage or distortion in the extruded piece by proper care in designing the extrusion to provide sections which do not vary widely in relative weight. It is particularly necessary to provide proper control in an extrusion which has thin sections, which tend to extrude more readily than the thicker portions of the member. The extrusion shown in Fig. 1 has been found to provide an arrangement of the fins or ribs which provide a balanced die or one in which the resistance to the extruding metal is uniform or symmetrical, thereby facilitating production and eliminating any distortion due to varying pressures at different points in the die. The straightening operation which is usually required in all extrusions has been reduced to a great extent in the extrusion described herein. As the cylindrical extrusion 4 emerges from the press it is split radially at its upper portion along the upper radial center line at the point 6 and a series of straightening rolls and guides immediately adjacent the die serve to outwardly bend or develop the original cylindrical extrusion into the form shown in Fig. 2 while the metal is still hot. The splitting or cutting referred to may be accomplished by a knife edge or cutter supported upon the outer cylindrical surface of the male mandrel immediately after the extruded material flows through the die and just prior to its being opened by the bending rollers.

The final treatment of the developed sheet can either be done immediately following the extrusion or elsewhere at a later time. When extrusions of aluminum alloys are subsequently developed or formed, since they are relatively soft after extruding, they could be readily formed cold prior to the heat treatment which develops the maximum physical properties. Magnesium alloys such as that more particularly described herein, however, would under similar circumstances require sufficient re-heating as the cold forming operation quite probably would cause cracks to appear in the section. Magnesium alloys are not usually heat treated except for the forming or working operation just described, since their maximum physical characteristics are developed by aging. This aging may be induced by mild heating, which accelerates the natural aging process, but no objectionable effects would result from re-heating the material. Such heat treatment also relieves internal stresses resulting from the forming operations and in the event of any warpage during the heat treatment, a final straightening operation is required.

Figure 2:
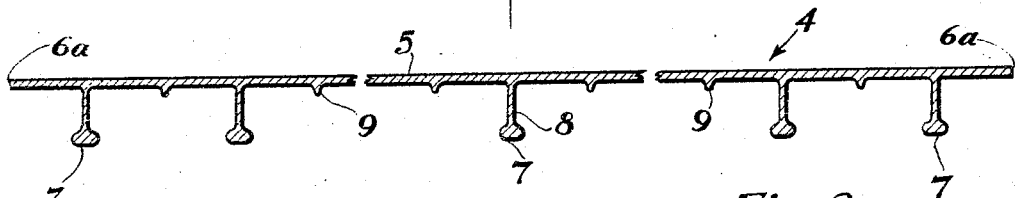
Fig. 2 is a similar cross sectional view of the same element as subsequently developed or bent into a flat working position.

As the cylindrical extrusion shown in Fig. 1 is split at 6 and developed and straightened into the flat form shown in Fig. 2, the edges of the split shell 5 become the outer lateral edges 6a of the flat extrusion shown in Fig. 2, the original circumference of the shell 5 now becoming the full width of the straightened extrusion. Similarly, as a result of the straightening process the major reinforcements 7—8 which previously extended outwardly in radial directions from the center of the axis of the cylindrical form have now been carried by the wall portion 5 such that they each remain perpendicular to the wall and now extend downwardly from the lower surface parallel with each other. This also applies to the longitudinal rib portions 9 which in the present embodiment are equally spaced from each other and between each of the major reinforcements 7—8 but omitted at the edges 6a of the straightened form. The present process is by no means limited to the extrusion of the precise form and size of that shown, since experience from actual production practice has indicated much latitude in die design and the ability to produce sheets of larger sizes from considerably larger extrusion presses.

Referring to the finished structural element as indicated in the cross section of Fig. 2, it will now be seen that it has been formed into a homogeneous element having a series of vertical parallel reinforcements 7—8 which are in effect small I-beams which are integral through the medium of their upper flanges with the plate or surface portion 5. It will therefore be seen that when this structural element is adequately supported at both its ends and edges its shape provides a high moment of inertia enabling it to withstand appreciable bending loads consistent with its allowable unit stressing when used as a simple beam or as a uniformly loaded panel. The neutral axis of the element under these loading conditions passes transversely through the webs 8 of the reinforcing portions somewhat closer to the plate 5 than to the bulb 7 of the reinforcement. The longitudinal ribs 9 are also effective in reinforcing the wall 5 against local forces exerted upon the plate between its points of major stiffening as determined by the spacing of the webs 8. Considerable latitude in design is, however, provided for increasing the thickness and cross section of both the plate portion 5 and the reinforcements 7—8 as well as the depth and spacing of the latter from each other.

Figure 3:
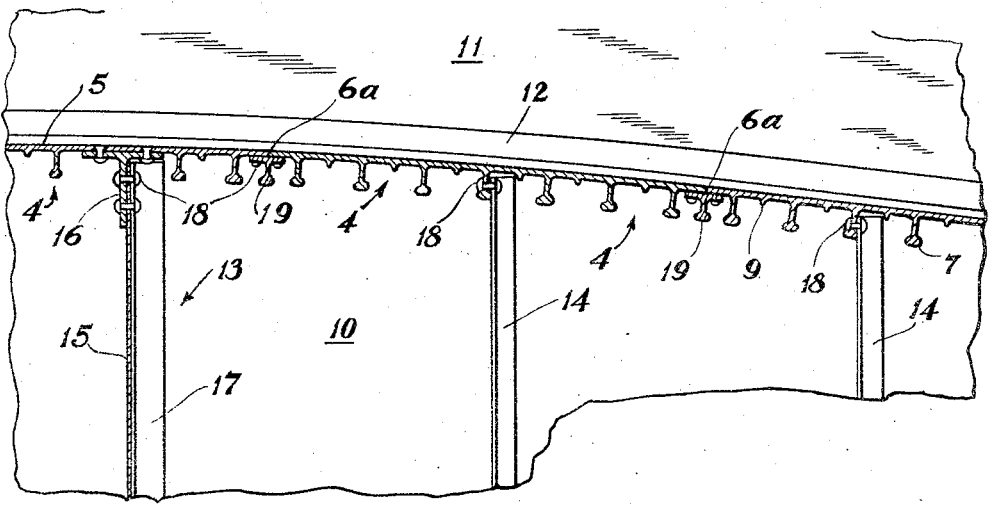
Fig. 3 shows a portion of the upper surface of a wing to which the extrusion has been applied as a covering.

The present structural element 4, while applicable as a wall or enclosure-forming portion of a number of various constructions, has been found particularly adapted for use as a stressed skin for an aircraft wing. Such an application is shown in Fig. 3 as applied to the upper surface of the cambered thicker portion of the wing. In this application the shell or plate portion 5 of the extrusion is bent beyond the flat or planar shape shown in Fig. 2 and into a convex shape determined by the profile of the wing of which it is to form a part.

Referring now to Fig. 3 an upper portion of an aircraft wing as indicated at 10, extending laterally or spanwise from a portion of the fuselage generally indicated at 11. At the juncture of the wing and the fuselage there is preferably provided a sealing angle 12 which is securely fastened to both the wing and fuselage structures, being formed both longitudinally and transversely to follow the local contours of both the fuselage and the wing. Under certain conditions the sealing angle 12 may be covered or faired by a thin fillet or similar root fairing to provide the desired aerodynamic reduction in drag along this juncture of the two aircraft bodies. The wing 10 is provided with one or more spar elements generally indicated at 13 and other vertical stiffening elements 14. The spar 13 is shown as comprising a generally vertical and spanwise extending web plate 15 riveted to a top chord of T cross section 16 by means of rivets 18, the web 15 being stiffened where necessary by vertical or diagonal bracing 17.

The structural elements 4 as described above are bent outwardly to conform with the wing profile and since the reinforcement portions 7—8 remain substantially perpendicular to the adjacent portions of the shell, or more specifically extend radially to the particular local arcuate curvature, they thereby lose their previous parallel relationship. The end portions 6a of the structural unit are preferably punched or drilled to match similar openings in the splice elements 19 which may be of T cross section with a bulbous stem portion as indicated in Fig. 3, or may take other suitable forms to provide an adequate splice at the abutting edges of the elements 4. Where the latter extend above a major structural element, such as the spar top chord 16, the local reinforcing rib 7—8 may be cut or milled off flush to permit the plate portion 5 of the element 4 to be riveted directly to the top flange of the chord member. Similarly, the vertical spars or stiffeners 14 may be attached to the web portions 8 by means of the rivets 18, the bulb portion either being milled off flush with the web or a suitable spacing element inserted between the web and the face of the stiffener 14 before they are riveted together.

In the construction which has been selected in Fig. 3 as a typical application, it will be noted that the structural units 4 form a box beam or girder construction in the wing together with the wing spar elements or beams 13. The edges of the adjoining skin portions 6a preferably abut each other such that a continuous and smooth outer surface of low drag characteristics is presented to the relative airstream with a minimum number of countersunk or flush fastenings appearing only at the edge portions 6a and the spanwise spaced ends of the sections 4. These skin elements are readily cut and shaped to accommodate the outward taper of the wing in the spanwise direction and the convergence of the spars in multi-spar wings. Their integral reinforcement is such that normally no ribs or formers extending in a chordwise direction are required, although under certain conditions where ribs might be necessary they could be accommodated either by passing through openings provided in the webs 8 or by being shaped to bear against, or otherwise receive the bulb portions 7 of the reinforcements.

Other forms and modifications of the present invention, both with respect to its general characteristics and its detailed features, will become apparent to those skilled in the art to which it pertains, but all are intended to be embraced within the scope and spirit of the present invention, as more particularly defined in the appended claims.

I claim:

1. In aircraft stressed-skin wing construction including a spar having a web element and a flanged top chord element, an extended metallic covering element rigidly attached to the flange of said spar chord, the said covering element comprising a wall portion of uniform thickness, an outer smooth face of said wall portion forming the exterior surface of said aircraft wing, parallel integral ribs extending inwardly into said wing and longitudinally only in the direction of said wing spar, said ribs having integral terminal portions of bulbous cross-section spaced from said side wall portion adapted to form with the remainder of said covering element a stress-taking structural part of said wing construction of relatively high resistance to buckling in compression.

2. A blank for an aircraft stressed-skin panel formed from an extruded metallic section having an arcuate wall of relatively greater length and width than its uniform thickness, said wall having a plain surface on one side only adapted to be addressed to the airstream and a plurality of laterally spaced enlarged longitudinal reinforcing ribs extending radially from its opopsite surface, said ribs having portions of bulbous cross-section at their free ends remotely spaced from the said wall portion to form therewith integral stiffeners of I-beam cross-section, said section adapted to be slit longitudinally intermediate a pair of said adjacent reinforcing ribs to form unbroken marginal attachment portions adapted to be bent laterally outward throughout its said width into a section of lesser curvature to cause said ribs to form substantially parallel reinforcements extending from the said second surface only of the finished stressed-skin panel opposite the said airstream-addressed plain surface.

3. A blank for an aircraft stressed-skin panel comprising an integrally formed section having an arcuate wall portion of uniform thickness, said wall portion being of relatively greater length and width than its said thickness, said wall portion having a plain surface on one side only adapted to be addressed to the airstream, a plurality of laterally spaced longitudinally arranged enlarged reinforcing ribs extending from its opposite side, said ribs having integral portions of bulbous cross-section formed at their tip portions remote from said wall portion, said ribs of bulbous cross-section forming in conjunction with the adjacent areas of said wall portion integral reinforcements of I-beam cross-section, a plurality of integrally formed longitudinal rib portions disposed between and parallel to said pair of bulbous tipped ribs and of relatively lesser depth than the same, the marginal edges of said wall portion being free of said rib portions to thereby provide attachment portions through the marginal edges of said wall portion of said section.

4. A stressed-skin surface panel element of extruded metal for aircraft adapted to form a compression member of a wing structure comprising a wall portion of substantially uniform thickness, a plurality of parallel integral ribs extending in the longitudinal spanwise direction only of said wing structure and projecting from the inner surface only of said wall portion, the said opposite face of said wall portion being smooth and uninterrupted for addressing to the airstream passing over said wing, and integral portions of bulbous cross-section space from said wall portion on the free terminals of said ribs arranged to form integral reinforcements of I-beam cross-section to materially increase the resistance to compression of said element.

5. In a stressed-skin aircraft construction, a body covering element of homogeneous extrudable metal having a laterally bendable wall portion of uniform thickness, a smooth face of said wall portion forming the exterior surface of said aircraft body, parallel integral ribs extending in a longitudinal direction only and projecting into said body from the opposite interior face of said wall portion, alternate ribs of said body covering element having integrally formed terminal portions of bulbous cross-section adapted to form integral reinforcements of I-beam cross-section to materially increase the moment of inertia and resistance to compression in the longitudinal direction of said body covering element whereby it forms a stress-taking structural part of said aircraft body.

6. A structural element blank for a stressed-skin panel for an aircraft wing comprising an extruded metal section having a cylindrical wall portion of uniform thickness, a plurality of peripherally spaced longitudinally extending ribs integrally extruded with said wall portion extending radially outwardly from the outside only of said cylindrical wall portion, said longitudinally extending ribs having an enlarged bulbous cross-section at their outer extremities remotely disposed from said wall portion to effectively form in conjunction with the adjacent areas of said wall portion integral reinforcements of I-beam cross-section, a plurality of integrally formed longitudinally extending protuberances of appreciably lesser radial depth than said bulbous cross-section ribs extending radially outwardly from the same said outside surface only of said wall portion parallel to and disposed intermediate all but two of said bulbous cross-section ribs, the said plain wall portion intermediate the said two ribs adapted to be slit longitudinally to form unbroken marginal attachment portions free from protuberances, the said slit cylindrical section adapted to be bent laterally away from the longitudinal plane of said slit beyond the flat plane condition of its said wall portion into a shape of reverse curvature in which said ribs and protuberances extend in substantial parallelism as integral reinforcements of the wing panel, the prior inner surface free from said ribs and protuberances providing a smooth exterior wing surface of convex curvature for exposure to the airstream and said marginal portions arranged for attachment to the internal structure of the wing to thereby form a homogeneous wing skin panel of relatively high moment of inertia and resistance to buckling under compressive forces developed in flight.

ROBERT P. DAVIE, Jr.

REFERENCES CITED

The following references are of record in the file of this patent:

UNITED STATES PATENTS

| Number | Name | Date |
|---|---|---|
| 223,289 | Joslin | Jan. 6, 1880 |
| 721,209 | Mannesmann | Feb. 24, 1903 |
| 721,211 | Mannesmann | Feb. 24, 1903 |
| 1,265,990 | Benner | May 14, 1918 |
| 1,348,374 | Plym | Aug. 3, 1920 |
| 1,407,414 | Hatano | Feb. 21, 1922 |
| 1,621,380 | Ruder | Mar. 15, 1927 |
| 1,891,740 | Westerman | Dec. 20, 1932 |
| 1,930,285 | Robinson | Oct. 10, 1933 |
| 1,940,830 | Weyerbacher | Dec. 26, 1933 |
| 1,540,558 | Merrill | June 2, 1935 |
| 2,047,223 | Prickett | July 14, 1936 |
| 2,188,423 | Andrews | Jan. 30, 1940 |
| 2,212,456 | Rethel | Aug. 20, 1940 |
| 2,281,207 | Schoen | Apr. 28, 1942 |

FOREIGN PATENTS

| Number | Country | Date |
|---|---|---|
| 323,698 | Germany | Aug. 3, 1920 |

OTHER REFERENCES

Scientific American Supplement, No. 1213, pages 19442, 19443, April 1, 1899 (copy in Div. 32, 257-262.5).